Oct. 15, 1963 R. H. McCORMICK Re. 25,462

FOOTBALL CLEANING MACHINE

Original Filed April 13, 1961 3 Sheets-Sheet 1

INVENTOR.
Rayna H. McCormick
BY William Cleland
Attorney

INVENTOR.
Rayna H. McCormick
BY William Cleland
Attorney

FOOTBALL CLEANING MACHINE

Original Filed April 13, 1961 3 Sheets-Sheet 3

INVENTOR,
Rayna H. McCormick
BY
William Cleland
Attorney

United States Patent Office

Re. 25,462

Reissued Oct. 15, 1963

25,462

FOOTBALL CLEANING MACHINE

Rayna H. McCormick, 125 S. Canton Road, Akron, Ohio

Original No. 3,072,936, dated Jan. 15, 1963, Ser. No. 102,687, Apr. 13, 1961. Application for reissue Apr. 25, 1963, Ser. No. 276,146

9 Claims. (Cl. 15—21)

Matter enclosed in heavy brackets [ ] appears in the original patent but forms no part of this reissue specification; matter printed in italics indicates the additions made by reissue.

This invention relates to a machine for cleaning balls, and in particular relates to a machine for cleaning ellipsoidal footballs.

In the past, machines have been provided for cleaning spherical balls by rotation of the same against brushes. These, however, have been generally unsatisfactory and unsuitable for cleaning ellipsoidal footballs for various reasons, such as that they permitted the balls to bounce or vibrate in such a manner that the cleaning operation was non-uniform and sometimes damagingly severe. The known types of ball cleaning machines have been somewhat heavy and cumbersome, and, therefore, unsuited for manually moving the same from place to place.

One object of the present invention is to provide a simple, compact machine for effectively cleaning balls in a minimum of time.

Another object of the invention is to provide a football cleaning machine including a sectional housing having *improved* ball-cleaning *and supporting* means therein adapted *for quickly and easily mounting the football in self-centering nesting relation in one section of the housing and then* to [be] embrace and rotatably support the ball *in said nesting relation* [thereupon] *upon* closing the housing sections.

Another object of the invention is to provide a ball cleaning machine of the character described having improved means for effectively drying wet, muddy footballs.

Still another object of the invention is to provide a ball cleaning machine having therein improved means for rotating an ellipsoidal football substantially about the major axis thereof to have substantially constant contact of rotary supporting members therewith.

Another object of the invention is to provide a football cleaning machine of the character described which is adapted to be manually transported to and about football playing fields for so-called "on the spot" cleaning operations.

These and other objects of the invention will be manifest from the following brief description and the accompanying drawings.

Figure 1:
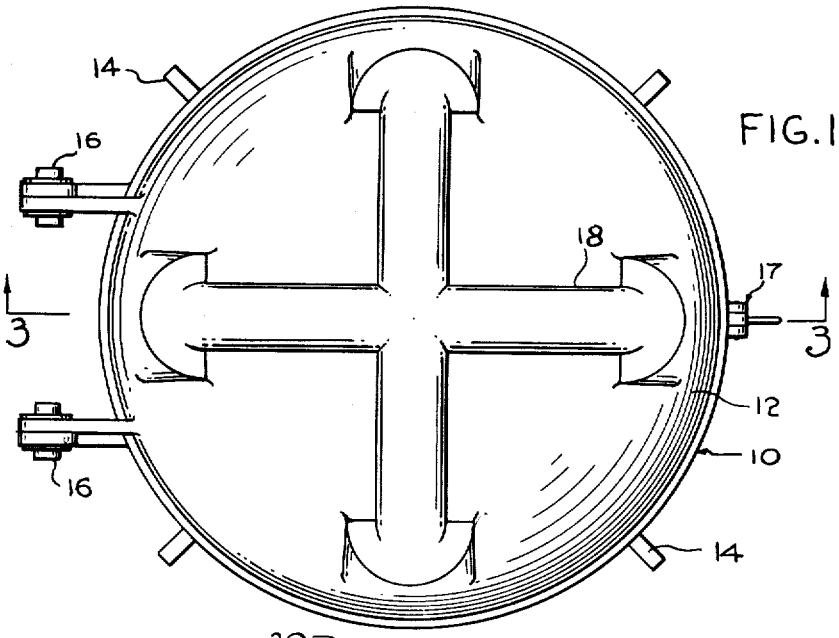
FIGURE 1 is a top plan view of a football cleaning machine embodying the features of the invention.
Figure 2:
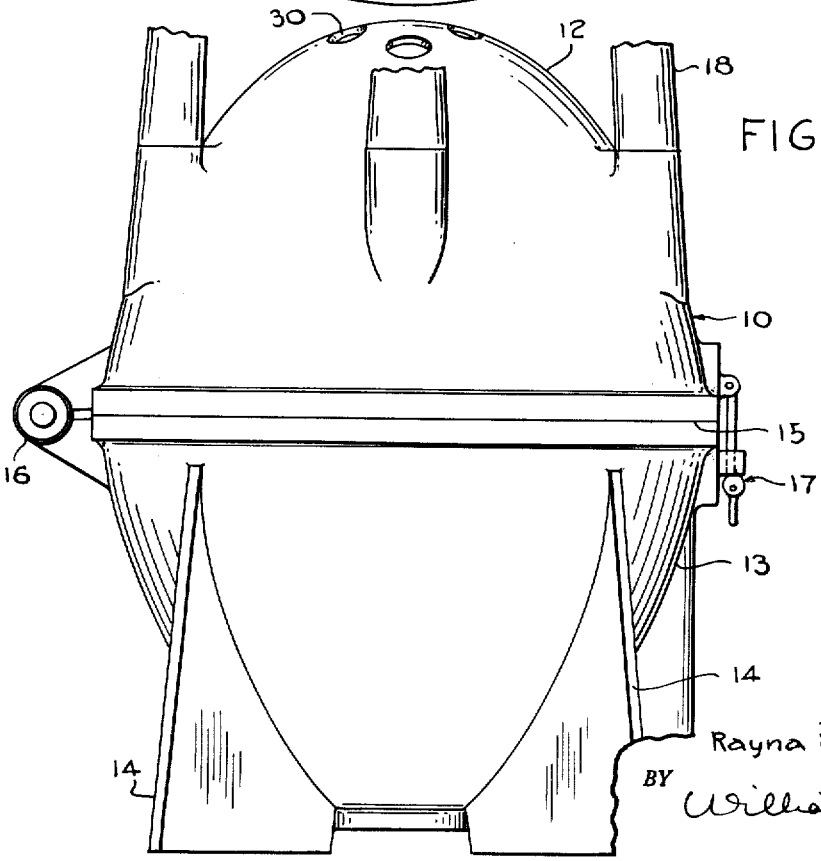
FIGURE 2 is a front elevation of the same.
Figure 3:
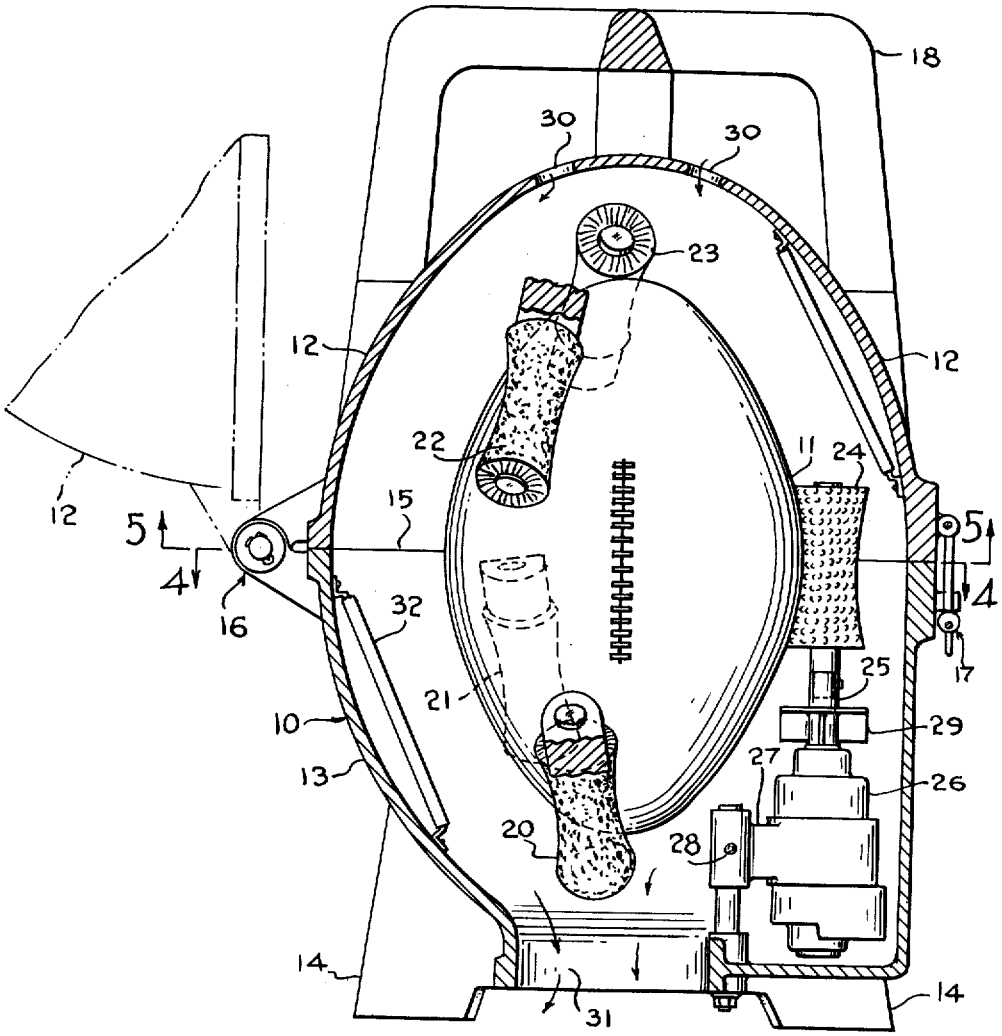
FIGURE 3 is a vertical cross-section taken substantially on the line 3—3 of FIGURE 1.
Figure 5:
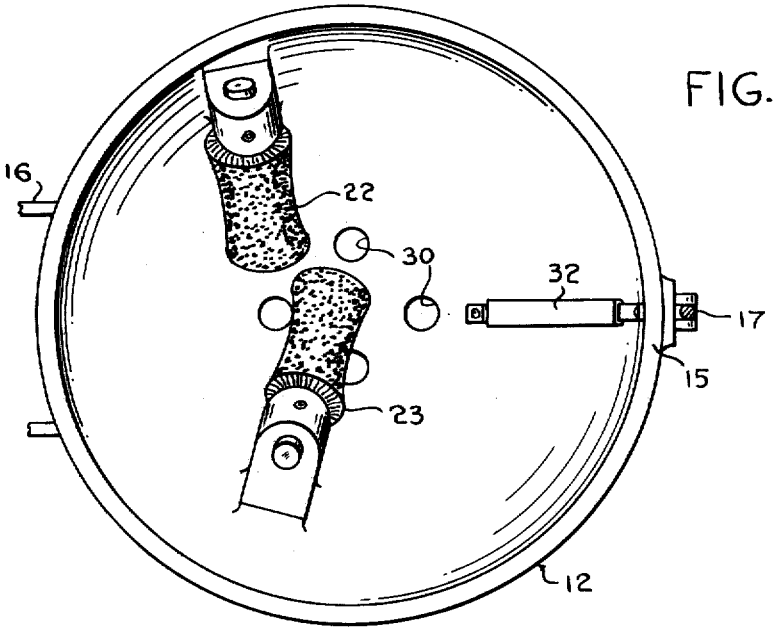
FIGURE 5 is a corresponding view of the top section of the machine, substantially as viewed upwardly on the line 5—5 of FIGURE 3.
Figure 4:
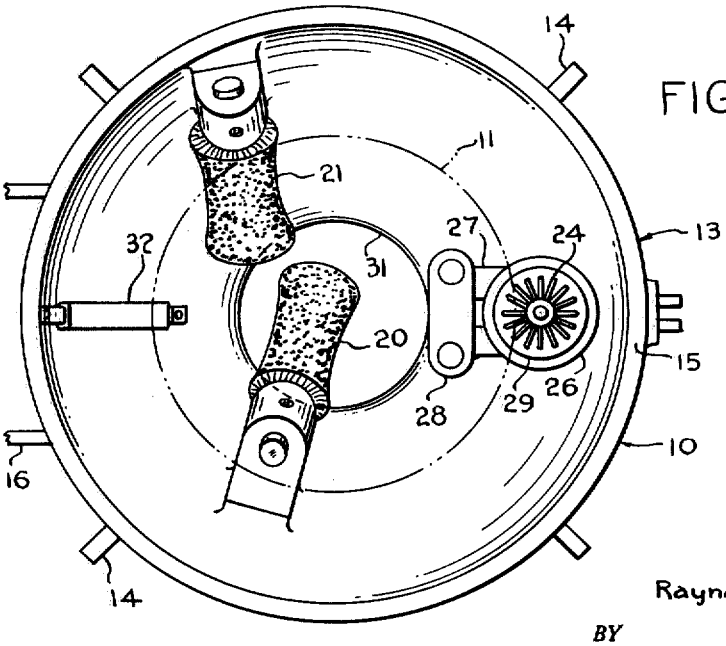
FIGURE 4 is a top plan view of the bottom section of the machine, as viewed substantially on the line 4—4 of FIGURE 3.

Referring to the drawings generally, and to FIGURES 3 to 5 in particular, the numeral 10 designates a hollow metal housing of generally ellipsoidal shape, adapted to have an ellipsoidal football 11 rotatably mounted therein with a substantial space between the ball and the wall of the housing. The housing includes top and bottom half sections 12 and 13, respectively, the bottom section 13 having peripherally spaced, integral leg portions 14, 14 for supporting the housing 10 on a flat supporting surface to have a major axis of the housing extending vertically and normal to the supporting surface. In the closed position of the housing, as shown in full lines in FIGURES 2 and 3, the top and bottom sections have complementally engaging seat portions at 15 in a horizontal plane through the median portion of the housing. The top section 12 is hinged to the bottom section, as indicated at 16 to be swung from the closed position thereof, to the open position indicated in chain-dotted lines at the left of FIGURE 3. A suitable quickly releasable locking device 17 is provided for locking the top and bottom sections in the closed condition, in which the housing may also be manually carried by means of handgrip means 18 on the upper portion of the top section.

For rotatably supporting football 11 to rotate about its major axis coincident with the major axis of the housing, a plurality of *guide or* brush members 20, 21, 22 and 23 may be rotatably mounted in housing 10 for cradling support of football 11 generally at the rear or hinged side of the housing radially of the vertical axis thereof, and the ball is firmly yieldingly urged toward said cradling support by a driven *guide or* brush member 24 which is rotatable against the ball to rotate the same about its major axis. The brushes or guide means 20 to 24 may be of elongated type having curvate or concave contours conforming to the curvature of the ball, and these brushes are arranged frictionally to engage the ball in adjoining, overlapping paths to brush the entire surface area of the ball with each rotation thereof. The brushes 20 to 23 may be of the type having stiff, flexible bristles and brush or roller 24 of heavier type having flexible bristles of molded plastic or rubber-like material.

The brushes 21, 22 and 24 are mounted in the bottom housing section 13 in peripherally spaced relation for centered [edgewise] *endwise* nesting reception of one end of the ball thereon, axially inwardly of the housing, when the top section 12 is swung open. In the closed position of the top section the brushes 22 and 23 hold the ball 11 in said nesting condition.

For rotating the driven brush 24, the same is affixed on a driven shaft 25 of an electric motor 26 fixedly mounted in housing section 13 by bracket means 27 and 28, the brush 24 being centered with respect to the median portion of the ball. A fan or blower 29 on driven shaft 25 is adapted to circulate drying air about the ball, the air being drawn through inlet ports 30, 30 in top section 12 and forced outwardly through an outlet port 31 in the bottom section. The circulating air may be heated by one or more electric heating units 32 mounted within the housing.

In use of the machine described above, it is placed on a supporting surface at a sideline of a football playing field, and plugged into a convenient electrical outlet, or an extension cord therefrom. When it is desired to clean and dry a wet, muddy ball, it is placed endwise into the bottom section 13 of housing 10 to support ball in self-centering nesting relation between the inwardly presented arcuate surfaces of the three lowermost brush members 20, 21 and 24. The top housing section 12 is then swung to the closed position shown in full lines in FIGURE 3, and locked to the bottom section by means of locking device 17, whereby the two curvate upper brushes 22 and 23 will have moved against the upper portion of the ball firmly to retain it in said nested relation against the inherent resiliency of the ball. Now, the motor 26 is operated to rotate brush 24 at requisite speed yieldingly against the central area of the ball, and thereby to rotate the ball about its own major axis against the opposing cradling support of the brush members 20 to 23, which are thereby rotated. Due to the yielding pressure of the ball against the bristles of the brush members 20 to 24, the contacting bristles of the respective brush members will be progressively resiliently flexed to whisk all mud and moisture from the ball surface, the entire surface area of the ball being so whisked with each revolution of the ball about its major axis. This whisking action may be continued for several minutes, aided by circulation of heated air downwardly through the closed housing, to clean and dry the ball. In actual use of the device disclosed herein, however, it has been found that a substantially wet muddy football may be cleaned and dried in less than one minute.

After stopping operation of motor 26, the locking device 17 is released to permit swinging the top section 12 to the open position, shown in chain-dotted lines in FIGURE 3, for easy removal of the ball from the bottom housing section, in clean, dry condition for immediate use on the playing field.

Modifications of the invention may be resorted to without departing from the spirit thereof or the scope of the appended claims.

What is claimed is:

1. A football or like ball cleaning machine, comprising, a housing, having selectively separable sections; a plurality of guide means mounted in said housing, for supporting the ball to rotate about an axis through the same; said guide means including a series of brush members, disposed to rotate on axes thereof for conforming frictional engagement of the respective brush members with substantial extents of the surface of the ball in the general direction of said axis and thereby brushing along axially spaced, peripherally coextensive paths cumulatively including substantially the entire surface area of the ball with each rotation of the same about said axis; and a plurality of said guide means receiving the ball in cradling support radially toward one side of said axis; at least one of said brush members being driven for inwardly frictionally engaging said ball surface at the other side of said axis and tending to urge the ball toward said cradling support, and to rotate the ball about said axis.

2. A machine as set forth in claim 1, wherein means is provided in the housing for exposing the ball to drying medium.

3. A machine as set forth in claim 1, wherein means is provided for circulating heated air within the housing.

4. A football or like cleaning machine, comprising, a housing having selectively separable, mating top and bottom sections, provided with means for releasably locking the sections in closed mating relation; a plurality of guide means mounted in said housing, for supporting the ball to rotate about a vertical axis through the same; said guide means including a series of brush members, disposed to rotate on axes thereof for conforming frictional engagement of the respective brush members with substantial extents of the surface of the ball in general direction of said vertical axes and thereby brushing along axially spaced, peripherally coextensive paths of corresponding widths cumulatively including substantially the entire surface area of the ball with each rotation of the same about said vertical axis; and a plurality of said guide means receiving the ball in cradling support toward a side radially of said vertical axis; at least one of said brush members being driven for inwardly frictionally engaging said ball surface at the other side of said vertical axis and tending to urge the ball toward said cradling support, and to rotate the ball about said axis; said guide means being disposed in said sections for self-centering nesting reception of corresponding axially opposite end portions of the ball when the sections are in closed mating relation.

5. A machine as set forth in claim 4, wherein means is provided in said housing for exposing the ball to drying medium.

6. A machine as set forth in claim 5, wherein said drying medium includes circulation of aid vertically through the housing.

7. A machine as set forth in claim 6, wherein said housing conforms generally to the shape of the ball and provides a space around the same, said housing having passage means in the upper and lower wall portions thereof for said circulation of said air.

*8. A machine for cleaning an ovate football, comprising: a housing including relatively fixed and movable mating sections, provided with means for releasably locking the sections in closed mating relation; a plurality of rotary guide members mounted in said housing for supporting the ball to rotate about the major axis of the same when the housing is closed; said guide members including a driven brush member mounted in said relatively fixed section to rotate about an axis substantially parallel to said major axis for conforming frictional engagement with the surface of the ball tending to rotate the same about said major axis; a plurality of said rotary guide members receiving the ball in cradling support at a side radially of said major axis opposite said driven member and disposed to rotate against the ball and thereby to maintain the ball in position to rotate about said major axis, whereby said driven brush member tends to urge the ball toward said cradling support and rotates the ball about said major axis; said guide members, in the open relationship of said mating sections, including a plurality thereof adapted to receive the ball in nesting relationship in one said mating section independently of the other.*

*9. A football cleaning machine as in claim 8, said driven brush member having spaced bristles of relatively stiff but flexible elastic material arcuately contoured for conforming engagement with the axial curvature of the ball surface.*

References Cited in the file of this patent or the original patent

UNITED STATES PATENTS

| | | |
|---|---|---|
| 928,832 | Woodward | July 20, 1909 |
| 1,583,470 | Kapp | May 4, 1926 |
| 1,798,322 | Floyd et al. | Mar. 31, 1931 |
| 2,656,557 | Vargo | Oct. 27, 1953 |
| 2,672,633 | Allen | Mar. 23, 1954 |

FOREIGN PATENTS

| | | |
|---|---|---|
| 4,117 | Great Britain | of 1882 |